United States Patent
Kamiya

(10) Patent No.: US 10,032,084 B2
(45) Date of Patent: Jul. 24, 2018

(54) IMAGE PROCESSING APPARATUS

(71) Applicant: DENSO CORPORATION, Kariya, Aichi-pref. (JP)

(72) Inventor: Yasunori Kamiya, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 0 days.

(21) Appl. No.: 15/500,485

(22) PCT Filed: Jul. 21, 2015

(86) PCT No.: PCT/JP2015/070716
§ 371 (c)(1),
(2) Date: Jan. 30, 2017

(87) PCT Pub. No.: WO2016/017477
PCT Pub. Date: Feb. 4, 2016

(65) Prior Publication Data
US 2017/0213094 A1 Jul. 27, 2017

(30) Foreign Application Priority Data

Aug. 1, 2014 (JP) .................. 2014-157779

(51) Int. Cl.
| | |
|---|---|
| *G06K 9/00* | (2006.01) |
| *G06T 7/73* | (2017.01) |
| *G06K 9/46* | (2006.01) |

(52) U.S. Cl.
CPC ....... *G06K 9/00805* (2013.01); *G06K 9/4604* (2013.01); *G06T 7/73* (2017.01)

(58) Field of Classification Search
CPC ..... G06K 9/00805; G06K 9/4604; G06T 7/73
(Continued)

(56) References Cited

U.S. PATENT DOCUMENTS

| | | | | |
|---|---|---|---|---|
| 8,711,214 B2* | 4/2014 | Fujiki | ............... | H04N 7/181 |
| | | | | 348/135 |
| 8,744,133 B1* | 6/2014 | Troy | ............... | G06T 7/001 |
| | | | | 382/106 |
| 2015/0379040 A1* | 12/2015 | Sheridan | ......... | G06F 17/30241 |
| | | | | 707/724 |

FOREIGN PATENT DOCUMENTS

| | | |
|---|---|---|
| JP | H08-114416 A | 5/1995 |
| JP | 2005-285011 A | 10/2005 |

(Continued)

*Primary Examiner* — Gregory F Cunningham
(74) *Attorney, Agent, or Firm* — Knobbe, Martens, Olson & Bear, LLP

(57) ABSTRACT

An image processing apparatus acquires a detection area in an image coordinate system expressing an area of a target object acquired from within an image, and derives a target spatial area in which the detection area is transformed to a corresponding position in a spatial coordinate system that simulates actual space in which the target object is present. In addition, the image processing apparatus identifies a reference physical model that simulates characteristics related to behavior and shape of the target object in the spatial coordinate system. Next, the image processing apparatus compares the target spatial area and the reference physical model on the spatial coordinate system, and corrects position and shape of the target spatial area based on the comparison result. Then, the image processing apparatus transforms the corrected target spatial area to a corresponding position in the image coordinate system, and outputs corrected area information expressing the corrected area.

13 Claims, 5 Drawing Sheets

(58) Field of Classification Search
USPC .......................................................... 382/103
See application file for complete search history.

(56) References Cited

FOREIGN PATENT DOCUMENTS

| | | |
|---|---|---|
| JP | 2011-030168 A | 2/2011 |
| JP | 2013-254242 A | 12/2013 |

* cited by examiner

FIG.2
(a) EXAMPLE OF APPROPRIATE DETECTION AREA
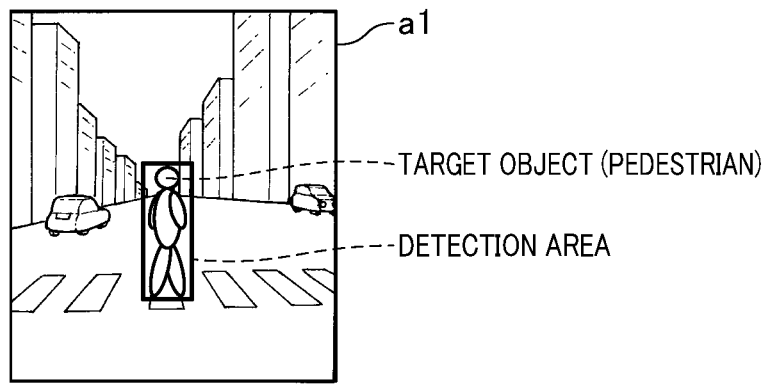
(b) EXAMPLE OF DETECTION AREA HAVING ERROR
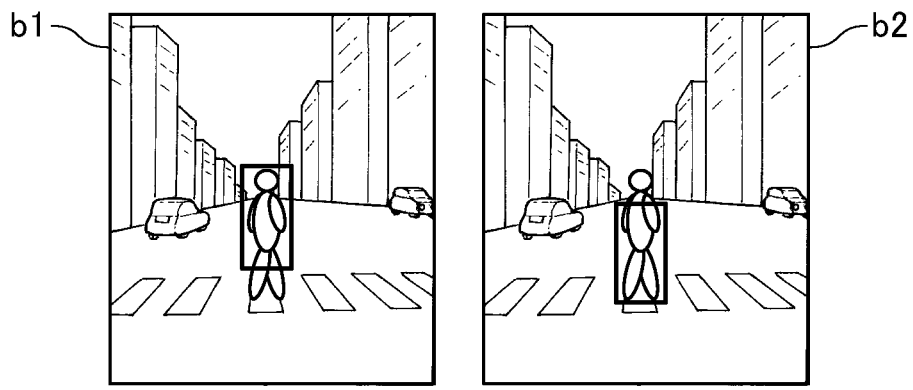
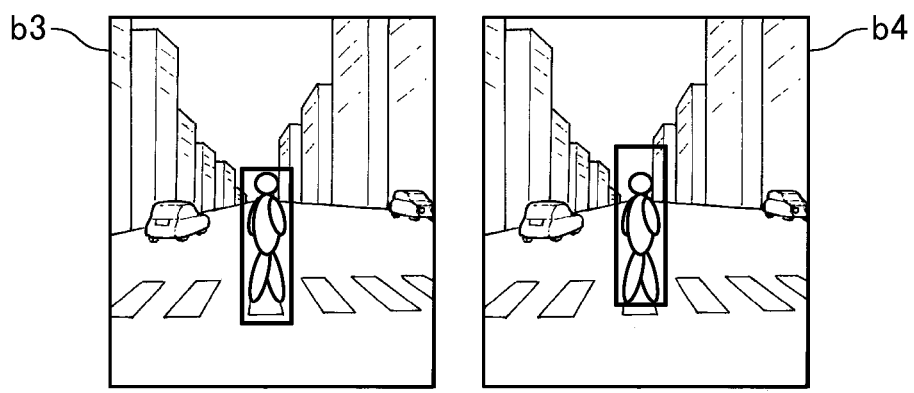

FIG. 3
(a) DETECTION AREA BEFORE CORRECTION
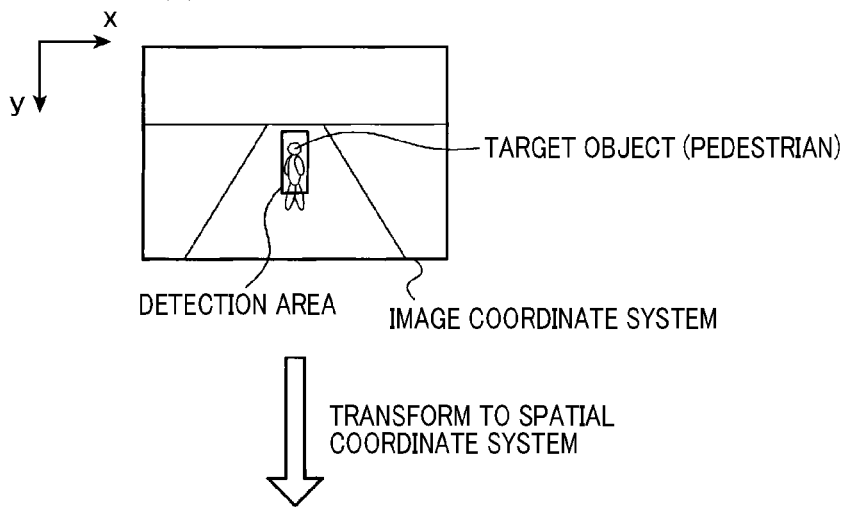
TRANSFORM TO SPATIAL COORDINATE SYSTEM
(b) COMPARE TO REFERENCE PHYSICAL MODEL ON SPATIAL COORDINATE SYSTEM
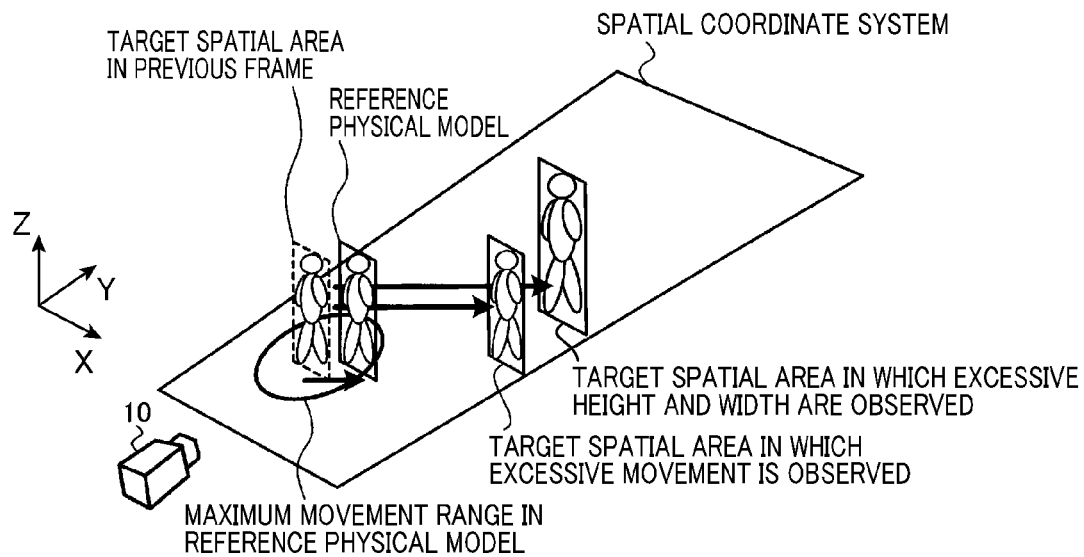
TRANSFORM TO IMAGE COORDINATE SYSTEM
(c) DETECTION AREA AFTER CORRECTION
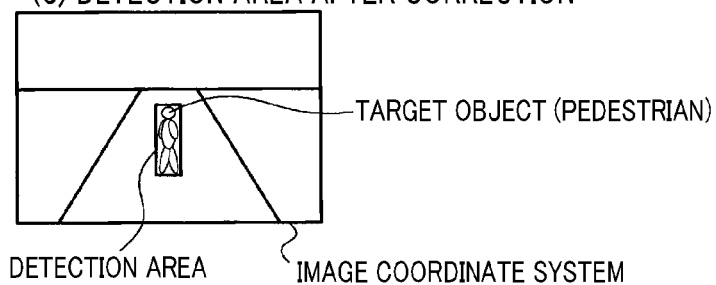

FIG.5
(a) IMAGE COORDINATE SYSTEM
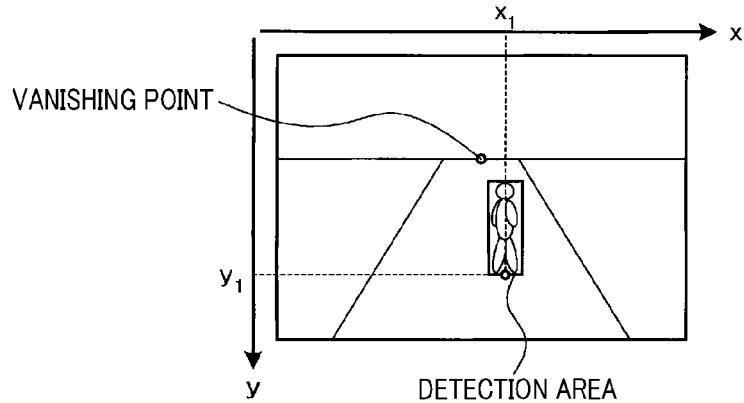
(b) SPATIAL COORDINATE SYSTEM
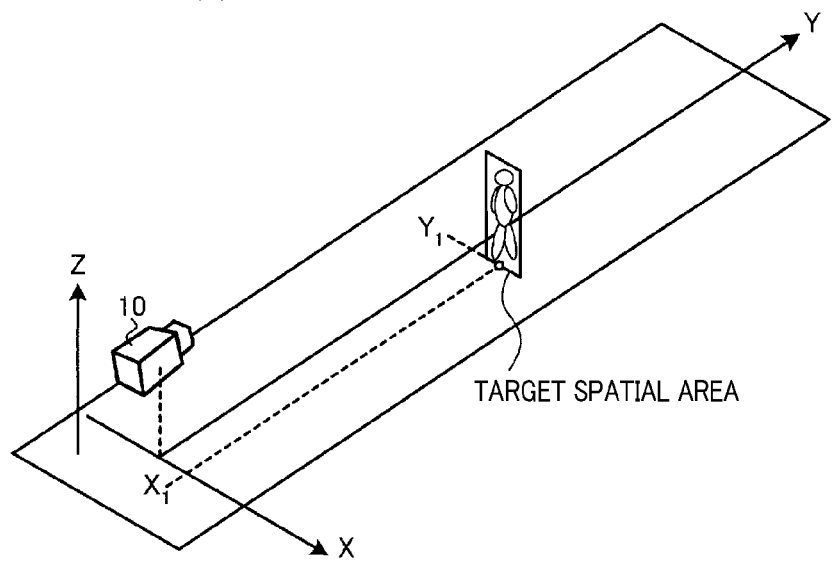
(c) MODEL OF PINHOLE CAMERA
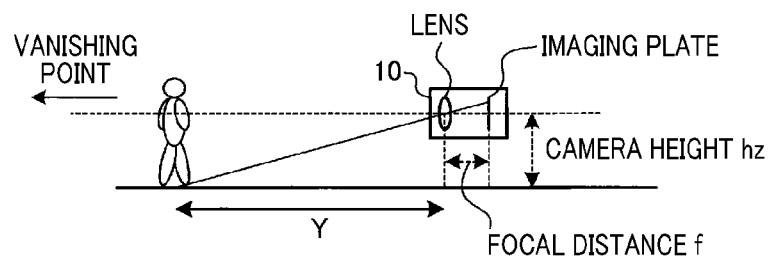

IMAGE PROCESSING APPARATUS

CROSS-REFERENCE TO RELATED APPLICATION

This application is a U.S. National Phase Application under 35 U.S.C. 371 of International Application No. PCT/JP2015/070716 filed on Jul. 21, 2015 and published in Japanese as WO 2016/017477 A1 on Feb. 4, 2016. This application is based on and claims the benefit of priority from Japanese Patent Application No. 2014-157779, filed Aug. 1, 2014. The entire disclosures of all of the above applications are incorporated herein by reference.

TECHNICAL FIELD

The present invention relates to an image processing apparatus that corrects an area of a target object acquired from within an image.

BACKGROUND ART

Conventionally, as a technology for detecting a target object, such as a person, a bicycle, or a motorcycle, present in the vicinity of a vehicle, for example, a technology in which image recognition is performed on an input image captured by a camera, through use of a recognition dictionary in which reference patterns of target objects are described is known.

For example, PTL 1 describes a technology in which a human candidate image is extracted through comparison of a captured image from a camera and a reference pattern indicating a luminance distribution for humans. In addition, as a method for acquiring the area of a target object within an image, in addition to image recognition such as that described above, there is an operation in which information indicating what is captured in the image is added by human operation, and information indicating the area of the target object being attached by human intent can be given.

CITATION LIST

Patent Literature

[PTL 1] JP-A-2005-285011

SUMMARY OF INVENTION

Technical Problem

In detection of a target object through image recognition, a problem arises in that error (light erroneous detection) occurs in the position and range of the image recognized as being the target object. Such errors in the detected position and range are considered to be caused by environmental conditions of the captured input image and the state (such as type or movement) of the target object.

In addition, in the method for acquiring the area of the target object within an image through human operation, a problem arises in that error caused by variations in human operation occurs in the position and range of the acquired area.

The present invention has been achieved to solve the above-described problems. An object of the present invention is to provide a technology for correcting misalignments in position and range in an area of a target object acquired from within an image.

Solution to Problem

An image processing apparatus of the present invention includes an area acquiring means, a first transforming means, a physical model identifying means, a correcting means, a second transforming means, and an output means. The area acquiring means acquires image area information expressing an area including an image of a target object acquired from within an image as a range in an image coordinate system. The first transforming means derives a target spatial area in which the area expressed by the image area information acquired by the area acquiring means is transformed to a corresponding position in a spatial coordinate system that simulates actual space in which the target object is present.

The physical model identifying means identifies a reference physical model that simulates characteristics related to behavior and shape of the target object in the spatial coordinate system. The correcting means compares the target spatial area and the reference physical model, and corrects position and shape of the target spatial area based on the comparison result. The second transforming means derives a corrected area in which the target spatial area corrected by the correcting means is transformed to a corresponding position in the image coordinate system. The output means outputs corrected area information expressing the corrected area derived by the second transforming means.

Errors in the position and shape of a target object acquired in image coordinates appear as significant changes in actual space. Therefore, as a result of an area recognized as a target object in an image being transformed onto a spatial coordinate system and then compared to a reference physical model, a determination may be made that the behavior and shape of the area recognized as the target object is in an abnormal state. For example, when a pedestrian is presumed as the target object, it can be considered that a reference physical model that simulates the standard movement speed, movement trajectory, shape, and the like of a pedestrian will be used. Then, when the target spatial area in which the image area recognized as the pedestrian is transformed onto the spatial coordinate system deviates from the reference physical model, it can be determined that the target spatial area indicates a behavior or shape that is abnormal for a pedestrian.

Then, as a result of the target spatial area being corrected based on the reference physical model in the spatial coordinate system and the corrected target spatial area being transformed back into the image coordinate system, the position and range of the detection area can be appropriately corrected in relation to the target object captured in the image. As a result, in image recognition and detection of a target object by humans, misalignment in the position and range of a detection area can be corrected, and detectability of a target object can be improved.

BRIEF DESCRIPTION OF DRAWINGS

In the accompanying drawings:

FIG. 2 illustrates, by (a), a diagram of an example of an appropriate detection area and, by (b), a diagram of examples of a detection area that has error;

FIG. 3 illustrates, by (a), a diagram of a detection area before correction, by (b), a diagram of a target spatial area on a spatial coordinate system and a reference physical model, and, by (c), a diagram of the detection area after correction;

FIG. 5 illustrates, by (a), a diagram of an image coordinate system, by (b), a diagram of a spatial coordinate system, and, by (c), a diagram of a model of a pinhole camera.

DESCRIPTION OF EMBODIMENTS

An embodiment of the present invention will hereinafter be described with reference to the drawings. The present invention is not limited to the embodiment described below and may be carried out according to various aspects.
[Description of Configuration of Object Detection System]

Figure 1:
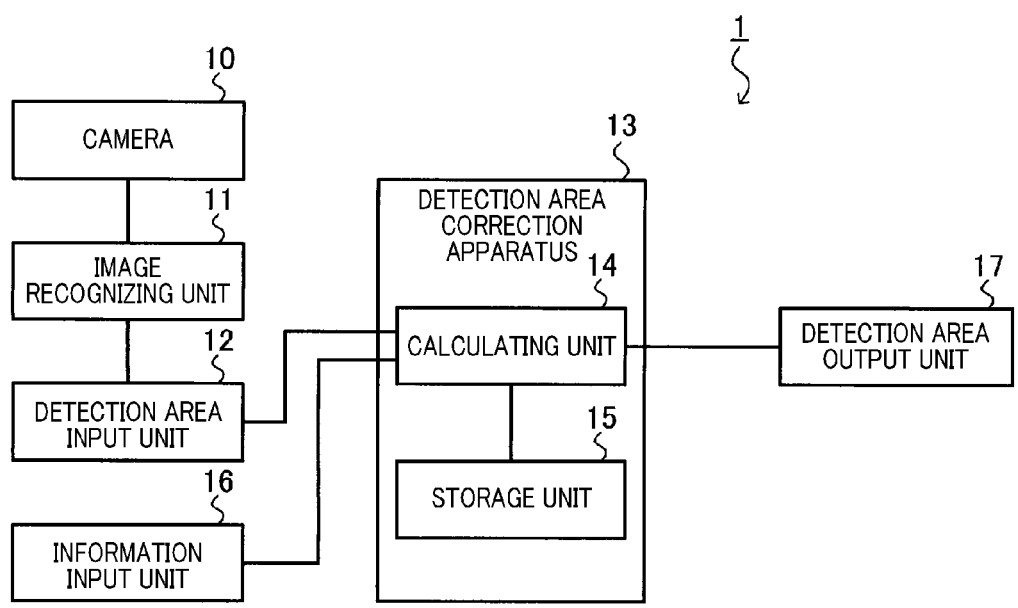
FIG. 1 is a block diagram of an overall configuration of an object detection system according to an embodiment.

An object detection system 1 according to the present embodiment is, for example, mounted in a vehicle or the like. The object detection system 1 is used to detect a specific target object, such as a person, a bicycle, or a motorcycle, present ahead of the vehicle. As shown in FIG. 1, the object detection system 1 includes a detection area correction apparatus 13. The object detection system 1 is configured by a detection area input unit 12, an information input unit 16, and a detection area output unit 17 being connected to the detection area correction apparatus 13.

A camera 10 is configured by an on-board camera or the like that captures an image of an area ahead of the vehicle. The image captured by the camera 10 is inputted to an image recognizing unit 11 as an input image. The image recognizing unit 11 is an image processing apparatus that performs a known image recognition process for detecting a target object from within the input image using recognition dictionaries in which target objects to be detected are described. The image recognizing unit 11 is capable of detecting various type of target objects using the recognition dictionaries provided for each type of target object to be detected, that is, a pedestrian and a two-wheel vehicle.

The detection area input unit 12 inputs, to the detection area correction apparatus 13, information on a detection area indicating a range of an image of the target object detected from within the input image by the image recognizing unit 11. The detection area is as shown in the example in FIG. 2 by (a). The detection area is an area having a predetermined shape (such as a rectangle) that includes an overall image area recognized as the target object in the input image. The information on the detection area inputted from the detection area input unit 12 to the detection area correction apparatus 13 includes a range (position, size, and the like) of the detection area on an image coordinate system expressed by coordinates on the image.

FIG. 2 shows, by (a), a case example of an appropriate detection area in which errors are not present in the position and range of the image area recognized as a target object, in relation to a target object (pedestrian) captured in an input image a1. In this case, the height and width of the image composing the target object (pedestrian) captured in the input image a1 and the height and width of the rectangle indicating the detection area are substantially equal, and the positions of both coincide.

However, in actuality, errors caused by various environmental factors occur in the position and range of the image recognized as the target object in the image recognition process. Therefore, as shown in the examples in FIG. 2 by (b), there are cases in which the image area of the target object (pedestrian) captured in the input images b1 to b4 and the detection area recognized as the target object do not coincide.

The detection area correction apparatus 13 is an image processing apparatus that handles a process in which errors in the detection area of a target object inputted by the detection area input unit 12 are corrected. The detection area correction apparatus 13 includes a calculating unit 14 and a storage unit 15. The calculating unit 14 is configured by an information processing unit including a central processing unit (CPU), a read-only memory (ROM), a random access memory (RAM), an input/output interface, and the like (not shown). The calculating unit 14 performs an area correction process in which the position and range of the detection area of a target object inputted from the detection area input unit 12 are corrected.

The storage unit 15 is a storage unit that stores therein a program in which a process performed by the calculating unit 14 is stored, as well as various types of information, such as data used when the program is run. In the storage unit 15, data for expressing a reference physical model applied in the area correction process performed by the calculating unit 14 is stored. The reference physical model is that in which characteristics of behavior and shape of a target object are expressed in a simulated manner on a spatial coordinate system corresponding to three-dimensional physical space in which the target object is present.

In the storage unit 15, as the data for expressing the reference physical model, parameters defining reference values for the behavior and shape of a target object are stored for each type of target object, such as a pedestrian, a bicycle, and a motorcycle. As the parameters related to the behavior of a target object, for example, those indicating characteristics such as speed, acceleration, and limitations in movement direction of the target object can be given. In addition, as the parameters related to the shape of the target object, for example, those indicating characteristics such as height, width, aspect ratio, and properties of changes in shape can be given.

The information input unit 16 is used to input various types of supplementary information to the detection area correction apparatus 13.

The detection area correction apparatus 13 uses the various types of supplementary information inputted from the information input unit 16 for coordinate transformation of the detection area in an area correction process, described hereafter, and simulation of the reference physical model. As specific examples of the supplementary information, information such as distance and road surface shape acquired from detection results from various types of sensors (not shown), such as a millimeter wave radar, a laser radar, and a stereo camera, can be given. In addition, as a specific example of the supplementary information, parameters related to the imaging environment of the camera 10, information expressing the behavior of the camera 10, that is, vehicle speed and yaw rate, and the like can be given.

The detection area output unit 17 is an on-board apparatus that, for example, presents a driver of the vehicle with a warning indicating that a person or a two-wheel vehicle is present, or performs vehicle control related to driving safety, based on the detection area on the input image corrected by the detection area correction apparatus 13. As this type of on-board apparatus, a control unit of a driving safety system or a driving assistance system of a vehicle can be given as an example.

[Overview of Method for Correcting Detection Area]

An overview of the method by which the calculating unit 14 of the detection area correction apparatus 13 corrects the position and range of the detection area corresponding to a target object detected from an input image will be described with reference to FIG. 3.

FIG. 3 shows, by (a), an example of a detection area (rectangle) before correction that is acquired from an input image from the camera 10. In the case example in FIG. 3 by (a), a state in which the recognized detection area is shifted upwards in relation to the image of the target object (pedestrian) captured near the center of the input image is presumed.

The calculating unit 14 transforms the detection area expressed on the image coordinate system to a target spatial area on a spatial coordinate system referencing an imaging position of the camera 10, based on the information on the detection area inputted from the detection area input unit 12 (see FIG. 3 by (b)). When the detection area expressed on the image coordinate system is transformed onto the spatial coordinate system, it can be considered that the position of the target spatial area will be calculated after relative movement attributed to the behavior of the camera 10, that is, vehicle speed and yaw rate, acquired from the information input unit 16 is removed. In addition, the position and shape of the target spatial area may be calculated using information, such as the distance to the target object, the size of the target object, and the road surface shape, acquired from the various sensors of the information input unit 16.

In addition, as shown as an example in FIG. 3 by (b), the calculating unit 14 identifies a reference physical model simulating the current position and shape of the target object in the spatial coordinate system. The calculating unit 14 identifies the current reference physical model by estimating movement range and shape with reference to a detection area obtained from a frame of a previous input image, using parameters indicating predetermined behavior and shape for each type of target object. In the case example in FIG. 3 by (b), a reference physical model simulating the standard movement speed and shape (such as height and width) of a pedestrian using the parameters corresponding to a pedestrian, among the parameters corresponding to each of a plurality of types of target objects, is generated. In addition, the information, such as the distance to the target object, the size of the target object, and the road surface shape, acquired from the various sensors of the information input unit 16 may be used to simulate the position and shape of the reference physical model of the target object.

Then, the calculating unit 14 compares the target spatial area expressed in the spatial coordinate system and the reference physical model, and based on the comparison result, corrects the position and range of the target spatial area. Specifically, as shown as an example in FIG. 3 by (b), when excessive movement or height and width is observed in a target spatial area and the upper limits of the movement range and shape indicated by the reference physical model are exceeded, the position and shape of the target spatial area are changed to be within the range of the limits of the reference physical model. When the shape of the target spatial area is corrected, a configuration can be considered in which, first, a length from an upper end to a lower end of the target spatial area is determined with reference to the reference physical model. From this point, a width from a left end to a right end of the target spatial area is calculated based on a predetermined aspect ratio.

Next, the calculating unit 14 reflects the correction in the detection area recognized from the input image by transforming the corrected target spatial area to the image coordinate system again (see FIG. 3 by (c)). The case example in FIG. 3 by (c) shows a state in which the positions of the upper end and the lower end of the detection area are corrected from the state in FIG. 3 by (a) as a result of the correction, and the detection area coincides with the image of the target object (pedestrian) captured near the center of the input image.

[Description of Area Correction Process]

The steps in the area correction process performed by the calculating unit 14 of the detection area correction apparatus 13 will be described with reference to the flowchart in FIG. 4. The process is a process that is performed for each frame of images captured by the camera 10.

At step S100, the calculating unit 14 acquires detection area information indicating the detection area including the image of the target object detected from within the input image, via the detection area input unit 12. At step S101, the calculating unit 14 acquires various types of supplementary information via the information input unit 16. Specifically, information related to the environment surrounding the target object, such as the distance to the target object, the size, and the road surface shape, parameters related to the imaging environment of the camera 10, information indicating the behavior of the camera 10, that is, vehicle speed and yaw rate, and the like can be given.

At step S102, the calculating unit 14 transforms the detection area on the image coordinate system indicated in the detection area information acquired at step S100 to a target spatial area on a spatial coordinate system. Here, the method for transforming the detection area from the image coordinate system to the spatial coordinate system will be described with reference to FIG. 5.

As shown in the example in FIG. 5 by (a), the image coordinate system is configured by a coordinate plane expressed by a set of two numbers (x,y), in which a horizontal direction of the image is an x axis and a vertical direction is a y axis. In the image coordinate system, an upper left corner of the image serves as a point of origin, and the pixel composing the image is the unit of the coordinate values.

Meanwhile, as shown in the example in FIG. 5 by (b), the spatial coordinate system is configured by a coordinate space expressed by a set of three numbers (X,Y,Z), in which, regarding a space that serves as an imaging range of the camera 10, a width direction is an X axis, a depth direction is a Y axis, and a height direction is a Z axis. In this spatial coordinate system, for example, an installation position of the camera 10 serves as a point of origin, and the unit of length used in actual physical space (such as meter) is the unit of the coordinate values.

Here, a lower end of the detection area on the image coordinate system shown as an example in FIG. 5(*a*) corresponds to a ground surface on the spatial coordinate system shown as an example in FIG. 5(*b*). The position coordinates of the target spatial area on the spatial coordinate system is calculated from the coordinates of the lower end of the detection area on the image coordinate system. In the case examples in FIGS. 5(*a*) and (*b*), coordinates (x1,y1) of the center of the lower end portion of the detection area on the image coordinate system correspond to coordinates (X1,Y1) on the ground surface on the spatial coordinate system. The position coordinates of the target spatial area on the ground surface is calculated based on a model of a pinhole camera shown as an example in FIG. 5(*c*). Two types of case examples are given regarding the specific calculation method thereof.

(1) The coordinates in the width direction X and the depth direction Y on the spatial coordinate system are calculated from a pixel amount hy by which the lower end of the detection area on the image coordinate system is below a vanishing point in the image in the vertical direction and a pixel amount wx by which the lower end is shifted from the vanishing point in the horizontal direction. Specifically, X and Y are calculated by a following expression <1>.

$$Y = f/hy \cdot hz$$

$$X = wx/f \cdot Y \qquad <1>$$

f is a focal distance of the camera 10, and hz is an installation height of the camera 10 (see FIG. 5(c)). In this calculation method, it is presumed that the ground from the camera 10 to the target object is flat.

(2) The coordinate in the depth direction Y on the spatial coordinate system is calculated from an actual height h or width w of the target object and a height hi or width wi in the image. In addition, the coordinate in the width direction X in the spatial coordinate system is calculated from the pixel amount wx by which the coordinates of the detection area in the image coordinate system are shifted from the vanishing point in the image in the horizontal direction. Specifically, X and Y are calculated by a following expression <2>.

$$Y = h/hi \cdot f \text{ or } Y = w/wi \cdot f$$

$$X = wx/f \cdot Y \qquad <2>$$

In this expression <2>, f is a focal distance of the camera 10, and hz is an installation height of the camera 10 (see FIG. 5(c)). However, the actual height h and width w of the target object are pieces of information that cannot be directly read from the captured image. Therefore, for example, supplementing the information on the height and width of the target object through substitution of predetermined standard values depending on the type of target object can be considered.

In the methods in above-described (1) and (2), spatial information on the target object obtained from the captured image is limited. The height Z of the target spatial area on the spatial coordinate system is not completely determined by only the image coordinate system. Therefore, estimation is made through modifications such as addition of a supposition that the ground from the camera 10 to the target object is flat, and addition of measurement results from the various sensors (such as radars) of the information input unit 16.

Figure 4:
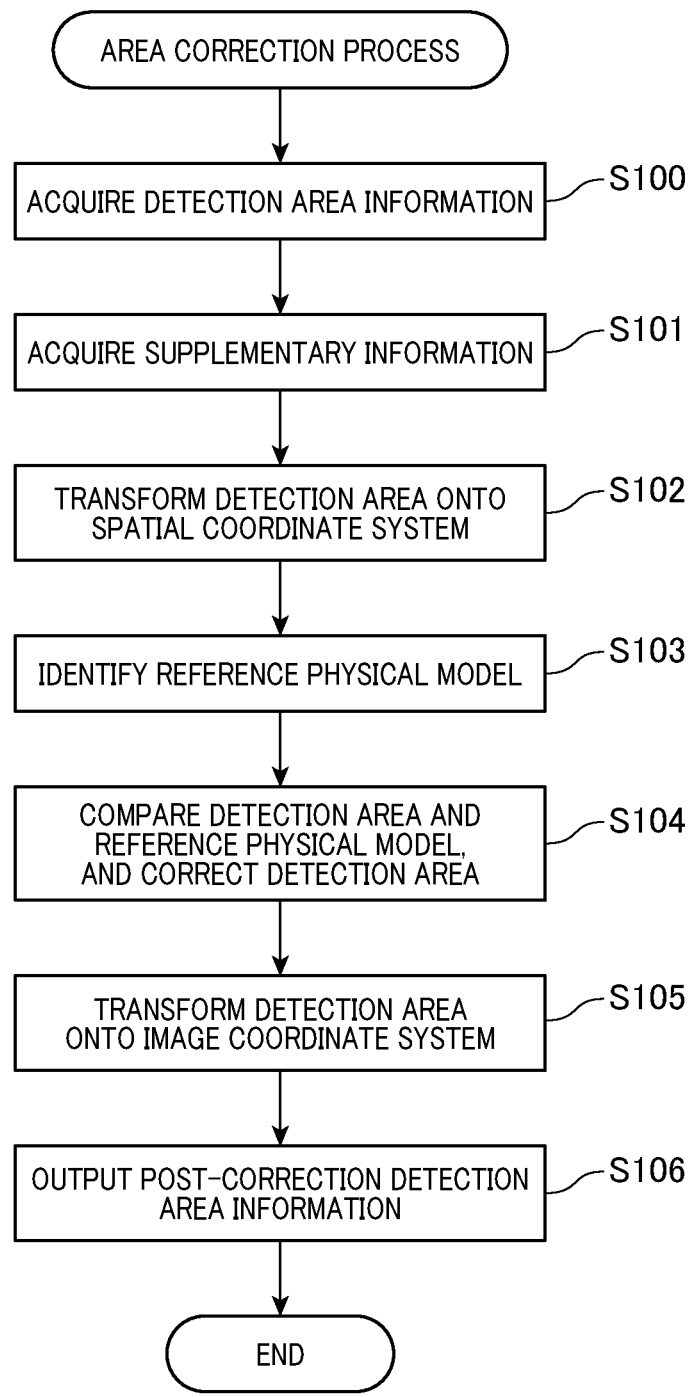
FIG. 4 is a flowchart of the steps in an area correction process.

Returning to the description of the flowchart in FIG. 4, at step S103, the calculating unit 14 identifies the reference physical model simulating the current state of the target object. Specifically, the calculating unit 14 identifies the current reference physical model by estimating the movement range and shape from a detection area obtained from a frame of a previous input image, using parameters indicating the characteristics of the behavior and shape of the target object.

At subsequent step S104, the calculating unit 14 compares the target spatial area calculated at step S102 and the reference physical model identified at step S103, and corrects the position and shape of the target spatial area. Specifically, when the target spatial area exceeds the upper limits of the movement range and shape expressed in the reference physical model, the calculating unit 14 changes the position and shape of the target spatial area to be within the range of limits of the reference physical model.

Then, at step S105, the calculating unit 14 transforms the target spatial area corrected at step S104 to the image coordinate system. At step S106, the calculating unit 14 outputs the detection area information indicating the detection area on the image coordinate system transformed at step S105 to the detection area output unit 17. After step S106, the calculating unit 14 ends the present process.

[Effects]

The object detection system 1 according to the embodiment achieves the following effects.

The detection area recognized as a target object in an image can be transformed to a target spatial area on a spatial coordinate system, and the target spatial area can be corrected with reference to a reference physical model corresponding to the target object. Then, as a result of the corrected target spatial area being transformed back into the image coordinate system, the position and range of the target object detected in the image can be appropriately corrected. As a result, in object detection through image recognition, misalignment of the position and range of the detection area can be corrected, and detectability of target objects can be improved.

The position and shape of the target object can be appropriately simulated through use of the reference physical model that simulates characteristics based on the type of target object, that is, a pedestrian or a two-wheel vehicle. In addition, transition of the target object can be accurately simulated by the current position and shape of the reference physical model being identified with reference to the target spatial area acquired from a previous image frame.

The target spatial area and the reference physical model can be accurately calculated in the spatial coordinate system through use of the supplementary information inputted from the information input unit 16 in the process for transforming the detection area from the image coordinate system to the spatial coordinate system and the process for identifying the reference physical model.

[Variation Examples]

According to the above-described embodiment, as shown in the example in FIG. 2, a case example in which the detection area indicating the range of the target object detected from an input image is a rectangle is described. However, the shape of the detection area is not limited to a rectangle and may be a graphic form of various shapes that enclose the image of the target object.

According to the above-described embodiment, a case example in which, for a target object detected from within an image through an image recognition process using a recognition dictionary in which target objects to be detected are described, a detection area thereof is corrected is described. The present invention is not limited thereto and can be carried out according to an aspect in which, for an area of a target object that is acquired by human intent from within an image by human operation, the position and shape thereof are corrected.

[Correspondence with Scope of Claims]

Correspondence between the terms used in the description of the above-described embodiment and the terms used in the expressions in the scope of claims will be indicated. The detection area correction apparatus 13 included in the object detection system 1 corresponds to an example of an image processing apparatus. In the area correction process by the calculating unit 14 of the detection area correction apparatus 13, step S100 corresponds to an example of an area acquiring means. Step S102 corresponds to an example of a first transforming means. Step S103 corresponds to an example of a physical model identifying means. Step S104 corresponds to an example of a correcting means. Step S105 corresponds to an example of a second transforming means. Step S101 corresponds to an example of a supplementary information acquiring means.

REFERENCE SIGNS LIST

1: object detection system
10: camera
11: image recognizing unit
12: detection area input unit
13: detection area correction apparatus
14: calculating unit
15: storage unit
16: information input unit
17: detection area output unit

The invention claimed is:

1. An image processing apparatus comprising:
an area acquiring means that acquires image area information expressing an area including an image of a target object acquired from within an image as a range in an image coordinate system;
a first transforming means that derives a target spatial area in which the area expressed by the image area information acquired by the area acquiring means is transformed to a corresponding position in a spatial coordinate system that simulates actual space in which the target object is present;
a physical model identifying means that identifies a reference physical model that simulates characteristics related to behavior and shape of the target object in the spatial coordinate system;
a correcting means that compares the target spatial area and the reference physical model, and corrects position and shape of the target spatial area based on the comparison result;
a second transforming means that derives a corrected area in which the target spatial area corrected by the correcting means is transformed to a corresponding position in the image coordinate system; and
an output means that outputs corrected area information expressing the corrected area derived by the second transforming means.

2. The image processing apparatus according to claim 1, wherein:
the physical model identifying means identifies a reference physical model that simulates the characteristics based on type of target object.

3. The image processing apparatus according to claim 2, wherein:
the correcting means corrects the position and shape of the target spatial area within a range with reference to the position and shape of the target object expressed by the reference physical model.

4. The image processing apparatus according to claim 3, wherein:
the physical model identifying means identifies current position and shape of the reference physical model with reference to a target spatial area obtained at a point in time prior to the target spatial area serving as a current comparison subject.

5. The image processing apparatus according to claim 4, further comprising:
a supplementary information acquiring means that acquires supplementary information including at least any of information detected by a detecting means for detecting a state or environment of the target object or information related to an imaging environment of the image, wherein
the first transforming means derives the target spatial area using the supplementary information acquired by the supplementary information acquiring means.

6. The image processing apparatus according to claim 5, further comprising:
a supplementary information acquiring means that acquires supplementary information including at least any of information detected by a detecting means for detecting a state or environment of the target object or information related to an imaging environment of the image, wherein
the physical model identifying means derives the reference physical model using the supplementary information acquired by the supplementary information acquiring means.

7. The image processing apparatus according to any claim 6, wherein:
the image processing apparatus is mounted in an object detection system that is mounted in a vehicle and detects a predetermined target object.

8. A detection area correction method of an image processing apparatus, the detection area correction method comprising:
acquiring, by an area acquiring means of the image processing apparatus, image area information expressing an area including an image of a target object acquired from within an image as a range in an image coordinate system;
deriving, by a first transforming means of the image processing apparatus, a target spatial area in which the area expressed by the image area information acquired by the area acquiring means is transformed to a corresponding position in a spatial coordinate system that simulates actual space in which the target object is present;
identifying, by a physical model identifying means of the image processing apparatus, a reference physical model that simulates characteristics related to behavior and shape of the target object on the spatial coordinate system;
comparing, by a correcting means of the image processing apparatus, the target spatial area and the reference physical model, and correcting position and shape of the target spatial area based on the comparison result;
deriving, by a second transforming means of the image processing apparatus, a corrected area in which the target spatial area corrected by the correcting means is transformed to a corresponding position in the image coordinate system; and
outputting, by an output means of the image processing apparatus, corrected area information expressing the corrected area derived by the second transforming means.

9. The image processing apparatus according to claim 1, wherein:
the correcting means corrects the position and shape of the target spatial area within a range with reference to the position and shape of the target object expressed by the reference physical model.

10. The image processing apparatus according to claim 1, wherein:
the physical model identifying means identifies current position and shape of the reference physical model with reference to a target spatial area obtained at a point in time prior to the target spatial area serving as a current comparison subject.

11. The image processing apparatus according to claim 1, further comprising:
    a supplementary information acquiring means that acquires supplementary information including at least any of information detected by a detecting means for detecting a state or environment of the target object or information related to an imaging environment of the image, wherein
    the first transforming means derives the target spatial area using the supplementary information acquired by the supplementary information acquiring means.

12. The image processing apparatus according to claim 1, further comprising:
    a supplementary information acquiring means that acquires supplementary information including at least any of information detected by a detecting means for detecting a state or environment of the target object or information related to an imaging environment of the image, wherein
    the physical model identifying means derives the reference physical model using the supplementary information acquired by the supplementary information acquiring means.

13. The image processing apparatus according to claim 1, wherein:
    the image processing apparatus is mounted in an object detection system that is mounted in a vehicle and detects a predetermined target object.

\* \* \* \* \*

UNITED STATES PATENT AND TRADEMARK OFFICE
CERTIFICATE OF CORRECTION

PATENT NO. : 10,032,084 B2
APPLICATION NO. : 15/500485
DATED : July 24, 2018
INVENTOR(S) : Yasunori Kamiya Page 1 of 1

It is certified that error appears in the above-identified patent and that said Letters Patent is hereby corrected as shown below:

In the Claims

In Column 10, Line 20, Claim 7, change "to any claim" to --to claim--

Signed and Sealed this
Sixth Day of November, 2018

Andrei Iancu
*Director of the United States Patent and Trademark Office*